(12) United States Patent
Mamiya

(10) Patent No.: US 7,830,545 B2
(45) Date of Patent: Nov. 9, 2010

(54) OPTICAL UNIT AND IMAGE FORMING APPARATUS

(75) Inventor: Toshiharu Mamiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1195 days.

(21) Appl. No.: 11/446,025

(22) Filed: Jun. 2, 2006

(65) Prior Publication Data

US 2006/0285170 A1   Dec. 21, 2006

(30) Foreign Application Priority Data

Jun. 15, 2005   (JP) .............................. 2005-175116

(51) Int. Cl.
G06K 15/12 (2006.01)
G06F 3/12 (2006.01)
B41J 15/14 (2006.01)
B41J 2/435 (2006.01)

(52) U.S. Cl. .................. 358/1.7; 358/1.1; 347/241; 347/242; 347/245

(58) Field of Classification Search .................. 358/1.1, 358/1.7, 1.9, 500, 505, 511; 347/112, 115, 347/152, 230, 231, 241, 242, 243, 245; 250/236, 250/237, 238
See application file for complete search history.

(56) References Cited

U.S. PATENT DOCUMENTS 5,539,447 A * 7/1996 Akuta et al. ................. 347/263

6,655,856 B2 * 12/2003 Nakanishi et al. ............. 385/94
7,215,349 B2 * 5/2007 Sakaue et al. ................ 347/138
2006/0098994 A1   5/2006 Tamaru

FOREIGN PATENT DOCUMENTS

| JP | 08-211316 A | 8/1996 |
|---|---|---|
| JP | 2000-10035 A | 1/2000 |
| JP | 2000-171744 A | 6/2000 |
| JP | 2004-54019 A | 2/2004 |
| JP | 2004-354563 A | 12/2004 |
| JP | 2005-062516 A | 3/2005 |

* cited by examiner

Primary Examiner—James A Thompson
(74) Attorney, Agent, or Firm—Canon U.S.A. Inc., I.P. Division

(57) ABSTRACT

At least one exemplary embodiment is directed to an optical unit adapted to irradiate image exposure light to an image carrier comprises a frame containing optical parts arranged therein and having an opening, and a cover adapted to cover the opening. The cover can be fixed by fixing members to the frame at three points in a first plane including the opening. The cover can further be fixed by fixing members to the frame at a second plane positioned on the frame and being adjacent to the first plane and at a third plane positioned on the frame and being not parallel to the second plane. Thus, an optical unit can be obtained which has high rigidity while, when the cover is attached to the opening, maintaining satisfactory flatness of the cover in a plane including the opening.

18 Claims, 20 Drawing Sheets

0.048mm/9.8N

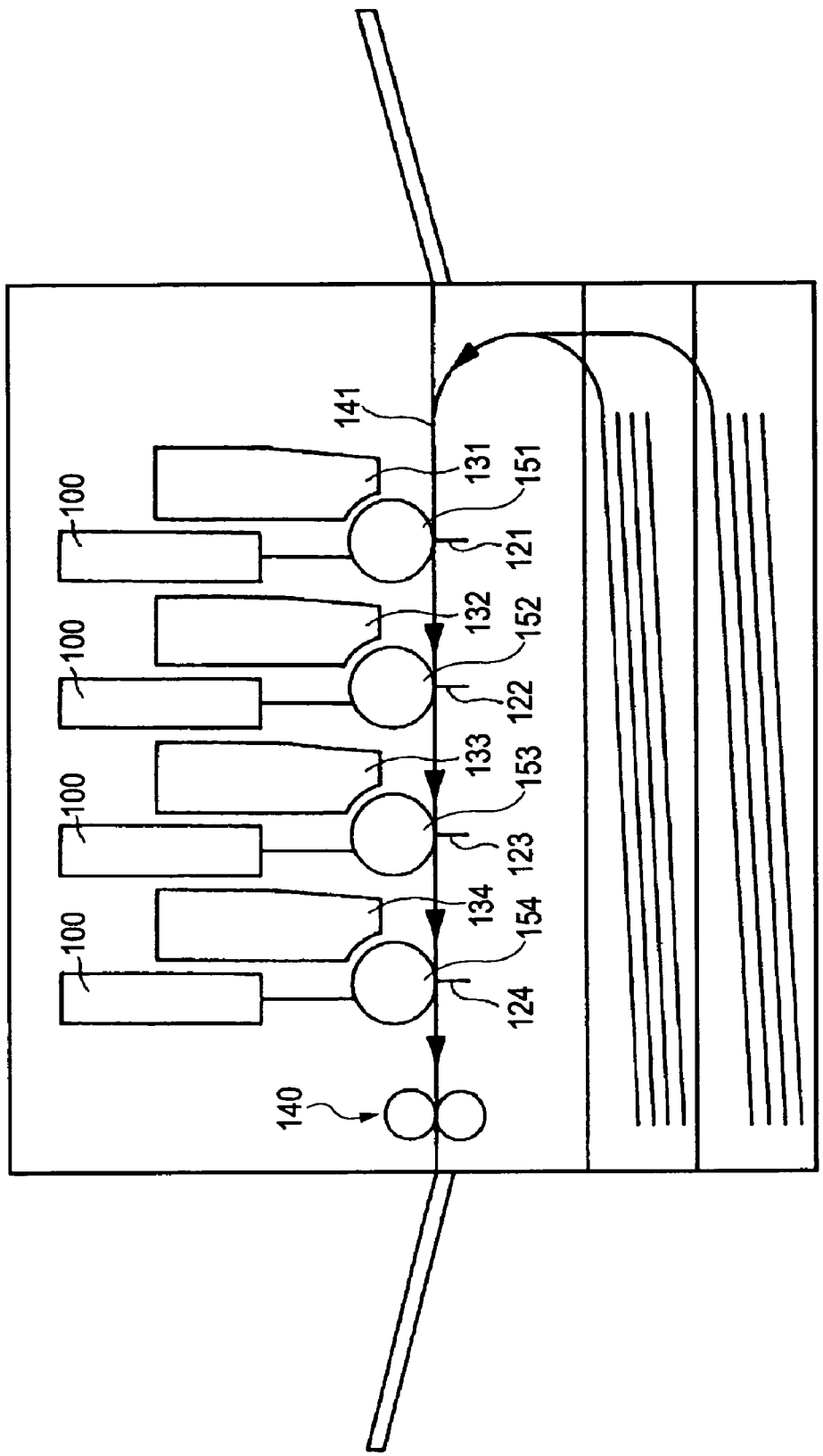

0.066mm/9.8N 0.046mm/9.8N

OPTICAL UNIT AND IMAGE FORMING APPARATUS

BACKGROUND OF THE INVENTION

1. Field of the Invention

The present invention relates to an optical unit for use in image forming apparatuses such as a laser beam printer and a digital copying machine.

2. Description of the Related Art

Hitherto, a scanning optical unit has been used in image forming apparatuses such as a laser beam printer and a digital copying machine. One example of the image forming apparatuses will be described below with reference to FIG. 9.

FIG. 9 is a schematic sectional view of a color image forming apparatus for recording image information in respective colors on a plurality of photoconductive drums and forming a color image by using a plurality of scanning optical units.

The color image forming apparatus comprises four scanning optical units 100, four photoconductive drums 151-154, four development units 131-134, and four transfer units 121-124, the last threes corresponding to the four scanning optical units in one-to-one relation. The color image forming apparatus further comprises a fusing unit 140 and a feed belt 141.

The four scanning optical units 100 are disposed corresponding to respective colors of C (cyan), M (magenta), Y (yellow) and Bk (black), and irradiate scanning lights onto the photoconductive drums 151, 152, 153 and 154 in accordance with respective image signals, thereby forming latent images on the drum surfaces. The latent images are developed by the development units 131-134 using toners in the respective colors, and the toner images on the photoconductive drums 151-154 are transferred respectively by the transfer units 121-124 to a recording material, e.g., a sheet of paper, which is transported on the feed belt 141. The not-yet fused toners on the sheet of paper are then fused and fixed to the sheet of paper under heating by the fusing unit 140.

In each of the scanning optical units, a light beam emitted from a light source and optically modulated in accordance with the image signal is cyclically deflected to perform scanning by an optical deflecting unit, e.g., a rotating polygon mirror. The deflected scanning light beam is focused by an image-forming optical system having an fθ characteristic into a spot-like shape on an image-formed surface of the photoconductive drum. The spot on the image-formed surface forms the electrostatic latent image with a combination of main scan by the optical deflecting unit and sub-scan by rotation of the photoconductive drum, thereby recording an image.

A scanning optical unit discussed in Japanese Patent Laid-Open No. 2004-054019 will be described below with reference to FIG. 7. FIG. 7 is a perspective view, partly broken, of the discussed scanning optical unit.

In the scanning optical unit 100, as illustrated in FIG. 7, a laser beam emitted from a light source 101 becomes a substantially parallel light beam through a collimator lens 102. After the quantity of light has been adjusted by a diaphragm 103, the parallel light beam enters a cylindrical lens 104 having refractive power only in the direction of sub-scan.

The parallel light beam having entered the cylindrical lens 104 exits the same lens in such a state that the beam remains substantially parallel in a main scan cross-section, while it is converged only in a sub-scan cross-section. The exiting beam is focused to form a linear image on a reflecting surface 105a of a rotating polygon mirror 105 that serves as an example of a deflection scanning unit.

The light beam deflected to perform scanning by the rotating polygon mirror 105 (i.e., the scanning light), is focused on an image-formed surface of a photoconductive drum 120 through an fθ lens 106 which constitutes an image-forming optical element having an fθ characteristic.

A dot image (spot) formed on the image-formed surface of the photoconductive drum 20 scans the drum surface in the direction of an arrow B while the rotating polygon mirror 105 is rotated in the direction of an arrow A. By such a combination of main scan and sub-scan with the rotation of the photoconductive drum 120 about its own rotation axis, an image can be recorded on the photoconductive drum 120 that serves as a recording medium.

If the surfaces of optical parts, e.g., the fθ lens 106 (made up of 106a and 106b), and the reflecting surface 105a of the rotating polygon mirror 105 become dirty, the image quality is deteriorated e.g., due to a reduction in the quantity of light. To avoid that deterioration, as illustrated in FIGS. 8A and 8B, the scanning optical unit is enclosed by a cover 150 and a sealing member 151 such that dust, will not enter an inner space of the scanning optical unit from the exterior.

As illustrated in FIG. 7, the collimator lens 102, the cylindrical lens 104, the rotating polygon mirror 105, and the fθ lens 106 are all disposed inside an optical box 152. The cover 150 is operatively connected to the optical box 152 by screws 153 so as to cover an opening of the optical box 152, whereby the inner space of the optical box is enclosed.

Positive sealing of the optical box 152 is facilitated by arranging the sealing member 151 in a properly compressed state between the fθ lens 106b and the cover 150. The sealing member 151 is given as an elastic member, e.g., an elastic soft urethane foam.

In the above-described scanning optical unit, a scanning line may not be curved in the direction of sub-scan. To that end, a transparent plane-parallel plate is disposed between the image-forming lens (fθ lens) and the photoconductive drum and is rotated about its longitudinal axis to compensate for a curving of the scanning line. With regards to a biased magnification of the scanning line, it is also known to make compensation by moving the plane-parallel plate in the longitudinal direction.

Such a registration adjustment is performed within a range of several tens microns, and an equivalent level of high accuracy can also be useful for an amount of compensation to be made using the image-forming lens.

However, even when the shape of the scanning line in each scanning optical unit is compensated for by using the plane-parallel plate, the relative positional relationship among the optical parts can be changed after the compensation due to, e.g., a deformation of the optical box containing the optical parts, and the scanning line can be deformed or deviated in shape or position sometimes.

One example of the deformation of the optical box is as follows.

In the scanning optical unit illustrated in FIGS. 8A and 8B, when the cover 150 and the optical box 152 made of materials having different linear expansion coefficients from each other are fixed by the screws 153 at plural points, a distortion occurs with temperature changes, and the optical box 152 can be deformed to cause the above-mentioned deviation of the scanning line as illustrated in FIGS. 10A and 10B.

In order to avoid such a deformation of the optical box with temperature changes, it was conventionally discussed to fix the cover and the optical box made of materials having different linear expansion coefficients from each other by screwing at one point and snap-fitting at plural points as illustrated in FIGS. 11 and 12. This conventional approach is effective in reducing the deformation due to heat and lessening the influence upon the scanning line.

In a scanning optical unit shown in FIGS. 11 and 12, a laser beam L1 generated from a light source unit 201 is condensed by a cylindrical lens 202 into a linear shape on a reflecting surface of a rotating polygon mirror 203 mounted to a deflecting unit 204. With rotation of the rotating polygon mirror 203, the laser beam is deflected to perform scanning.

The deflected scanning laser beam enters an fθ lens made up of a refractive optical element 206 and a diffractive optical element 207, and is then focused to form an image on a photoconductive member of a photoconductive drum 120 serving as an image carrier.

An optical box 208 containing the above-mentioned various optical parts is in the form of a resin molding. A cover 210 made of a metal sheet is mounted to the optical box 208 in such a state that an elastic member (sealing member) 209, e.g., a urethane foam, is disposed on an upper surface of the diffractive optical element 207. An inner space of the optical box 208 is thereby enclosed.

The cover 210 is operatively connected to the optical box 208 in one fixed portion 250 by screwing and at a plurality of fixed portions 251a-251c by snap-fitting.

The cover 210 is mounted to the optical box 208 by sliding the cover 210 in the direction of an arrow 252 to be engaged with the optical box 208 in the snap-fitted portion 251a.

For example, where the cover 210 and the optical box 208 are subjected to thermal expansion with a rise in temperature, the cover 210 and the optical box 208 are fastened together only in one fixedly screwed portion 250. On the other hand, in the snap-fitted portion 251c, the cover 210 is operatively connected to the optical box 208 while facilitating deformation of the cover 210 in the sliding direction (i.e., in the direction of the arrow 252) due to thermal expansion. This is similarly applied to the snap-fitted portions 251a and 251b. It is therefore possible to absorb deformations caused due to the difference in thermal expansion coefficient between the cover 210 and the optical box 208.

Another example of the deformation of the optical box is as follows.

FIGS. 13A and 13B are sectional views showing another known scanning optical unit. In this known scanning optical unit, a laser beam generated from a semiconductor laser (not shown), which is disposed inside an optical box 301, becomes a parallel beam through a collimator lens. After the parallel beam is shaped by an aperture, the shaped light beam is condensed by a cylindrical lens 302 onto a reflecting surface of a rotating polygon mirror 303. With rotation of the rotating polygon mirror 303, the light beam is deflected to perform scanning in the direction perpendicular to a rotation axis of the rotating polygon mirror 303 (i.e., in the direction of main scan), and it is focused to form an image on a photoconductive member of a rotating drum D through an fθ lens 304 and a folding mirror 305. The light beam focused on the photoconductive member forms an electrostatic latent image by a combination of a main scan with the rotation of the rotating polygon mirror 303 and a sub-scan with the rotation of the rotating drum D.

In order to obtain a highly-accurate image in that image forming apparatus, one can adjust a spot size of the optical beam focused on the photoconductive member of the rotating drum D. To that end, the cylindrical lens 302 is moved along the optical path of the light beam by using a tool, and the cylindrical lens 302 is operatively connected to the optical box 301 by bonding or another suitable manner at such a position that the spot size on the photoconductive member has a proper value.

Also, a deviation and an inclination of the scanning line formed by the light beam on the photoconductive member have to be adjusted so that the image is formed at a proper position e.g., with respect to a sheet of recording paper. To that end, when the optical box 301 is operatively connected to an optical bench, first and second positioning members 312 are adjusted for proper positioning of the optical box 301 relative to the rotating drum D.

In the above-described scanning optical unit, if the cover 320 closing an upper opening of the optical box 301 has a deformation, e.g., a warp, as illustrated in FIG. 13A, the optical box 301 is entirely deformed following the warp of the cover 320, as illustrated in FIG. 13B, when the cover 320 is fastened to the optical box 310 by screws, for example. This gives rise to the problem that the spot size on the photoconductive member of the rotating drum D is changed, or that the scanning line is deviated.

As one solution to cope with such a deformation caused by mounting of the cover, Japanese Patent Laid-Open No. 2000-010035 discusses that openings for adjustment work are formed in the cover, as illustrated in FIG. 14, thus facilitating the adjustment work to be performed, as required, after the cover has been mounted to the optical box.

As in the case of FIG. 14, the semiconductor lens, the collimator lens, the cylindrical lens 302, the rotating polygon mirror 303, the fθ lens 304, and the folding mirror 305 can be arranged inside an optical box 401, and an upper opening of the optical box 401 is enclosed by a cover 420.

The cover 420 has an opening 421 opened to face the cylindrical lens 302 and an opening 422 opened to face the positioning member 312. The tool used for the adjustment work can be inserted into the optical box 401 through each of the openings 421 and 422. The cover 420 is operatively connected to the optical box 401 by not-shown fixing members, e.g., screws.

The spot size of the light beam focused on the photoconductive member of the rotating drum D is adjusted by changing the position at which the cylindrical lens 302 is assembled to the optical box 401, after the mounting of the cover 420. For example, the tool can be inserted through the opening 421 of the cover 420 to move the cylindrical lens 302 along the optical path of the light beam, and the cylindrical lens 302 is operatively connected to a bottom wall of the optical box 401 at such a position that the spot size on the photoconductive member has a proper value. Also, the deviation and the inclination of the scanning line on the photoconductive member have to be adjusted by changing the position of the positioning member 312.

The adjustment work for the deviation and the inclination of the scanning line is performed by inserting the tool (not shown) through the opening 422 of the cover 420. After the adjustment work, each positioning member 312, 412 is operatively connected to the optical box 401 by the known manner, and the optical box 401 is operatively connected to the optical bench 430 by a screw 431. The openings 421 and 422 are closed by a cover sheet 423 after the adjustment work.

Thus, by inserting the tool through the opening 421 or 422 of the cover 420 and adjusting the position of the cylindrical lens or the positioning member after the cover 420 has been fixed to the optical box 401, even if the cover 420 is warped and the optical box 401 is deformed when the cover is fastened to the optical box, the resulting distortion can be compensated for with the adjustment of the cylindrical lens and the positioning member.

Further, Japanese Patent Laid-Open No. 2000-171744 discusses a method of fixing a lid of an optical box to the optical box at three points by screwing.

In addition to the deformation of the optical box caused by the difference in linear expansion coefficient between the components and the deformation of the optical box caused by the warp of the cover, however, there are other factors causing the deviation of the scanning line on the photoconductive member.

The other factors causing the deviation of the scanning line include a deformation of the optical box generated when the optical box is mounted to the image forming apparatus, and vibration generated by the image forming apparatus.

In many recent scanning optical units, as illustrated in FIGS. 15 and 16, the unit size and cost are reduced by scanning light beams from a plurality of light sources over a plurality of photoconductive members with one deflecting unit. Particularly in that type of scanning optical unit, the deformation of the optical box can be suppressed more strictly.

For that purpose, it is useful to increase the rigidity of the scanning optical unit in its entirety and to restrict the deformation of the optical box with higher reliability. Because of a limitation in restricting the deformation of the optical box just by increasing the rigidity thereof, it is further required to more firmly mount a cover having higher rigidity and to increase the rigidity of the entire optical box including the cover.

Among the above-cited Patent Documents intended to cope with the deviation of the scanning line on the photoconductive member, in Japanese Patent Laid-Open No. 2004-054019, the cover is fastened to the optical box at one point by screwing. Therefore, the rigidity of the scanning optical unit is hardly increased even with the mounting of the cover to the optical box. Also, in Japanese Patent Laid-Open No. 2000-171744, because the lid is operatively connected to the optical box at three points just by screwing, high rigidity cannot be obtained in the entirety of the optical box.

FIGS. 17 and 18 are an overall perspective view and a plan view of another known scanning optical unit, respectively. As illustrated in FIG. 17, a scanning optical unit 30 comprises an optical box 31 and a cover 32. Inside the optical box 31, as illustrated in FIG. 16, there are disposed a deflecting unit 4, fθ lenses 5a and 5b, and a plurality of folding mirrors 6, 7 and 8 for introducing a plurality of light beams, which are deflected to perform scanning by the deflecting unit 4, to a plurality of corresponding photoconductive members. Also, the cover 32 has a plurality of slits 32a through which the plurality of light beams deflected to perform scanning are facilitated to exit toward the exterior of the scanning optical unit. Further, a plurality of reinforcing ribs 32b are provided near the slits 32a, respectively, to increase the rigidity of an entire box structure in cooperation with side walls disposed along an outer periphery of the optical box.

In addition, to increase the rigidity of the entire optical box when the cover and a box frame are fixed together, the cover 32 is fastened to the optical box 31 at six points indicated by A-1 to A-6, as illustrated in FIG. 17.

Because of variations in production accuracy of parts such as the cover and the box frame, however, flatness of an opening plane cannot be held at a satisfactory level depending on the variations in parts production accuracy when the parts are fastened together at many points in the same plane as in the above-mentioned known scanning optical unit. Consequently, the box frame is also affected and a torsion occurs in the optical box.

SUMMARY OF THE INVENTION

The present invention is directed to an optical unit which has high rigidity while, when a cover is attached to an opening, maintaining satisfactory flatness of the cover in a plane including the opening.

The present invention is directed to an optical unit adapted to perform exposure, the optical unit including a frame containing optical parts arranged therein and having an opening; and a cover adapted to cover the opening, the cover being fixed to the frame at three points in a first plane including the opening, the cover being further fixed to the frame at a second plane positioned on the frame and being adjacent to the first plane and at a third plane positioned on the frame and being not parallel to the second plane.

Further features of the present invention will become apparent from the following description of exemplary embodiments with reference to the attached drawings.

BRIEF DESCRIPTION OF THE DRAWINGS

FIG. 9 is a schematic sectional view showing one example of an image forming apparatus using the scanning optical units.

DESCRIPTION OF THE EMBODIMENTS

Figure 1:
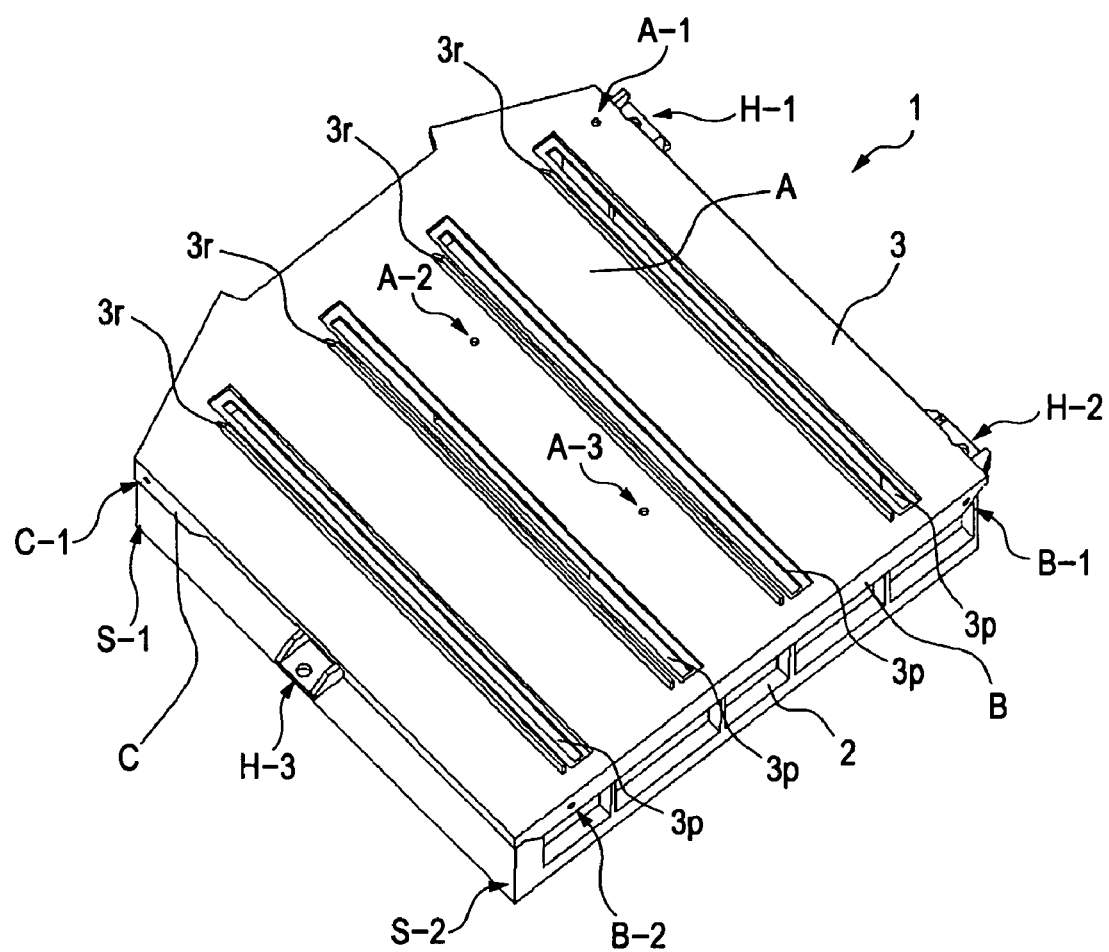
FIG. 1 is a perspective view of a scanning optical unit according to a first exemplary embodiment of the present invention.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens and mirror elements and their materials.

In all of the examples illustrated and discussed herein any specific values, for example the spot size, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Exemplary embodiments will be described in detail below with reference to the drawings and embodiments. It can be noted that dimensions, materials, shapes, and relative layouts of components described in the following exemplary embodiments are not purported to limit the scope of the invention to the discussed ones unless particularly so specified. Further, in the following description, materials, and shapes of components described once are the same through the entire description unless particularly specified otherwise.

(Image Forming Apparatus)

Figure 15:
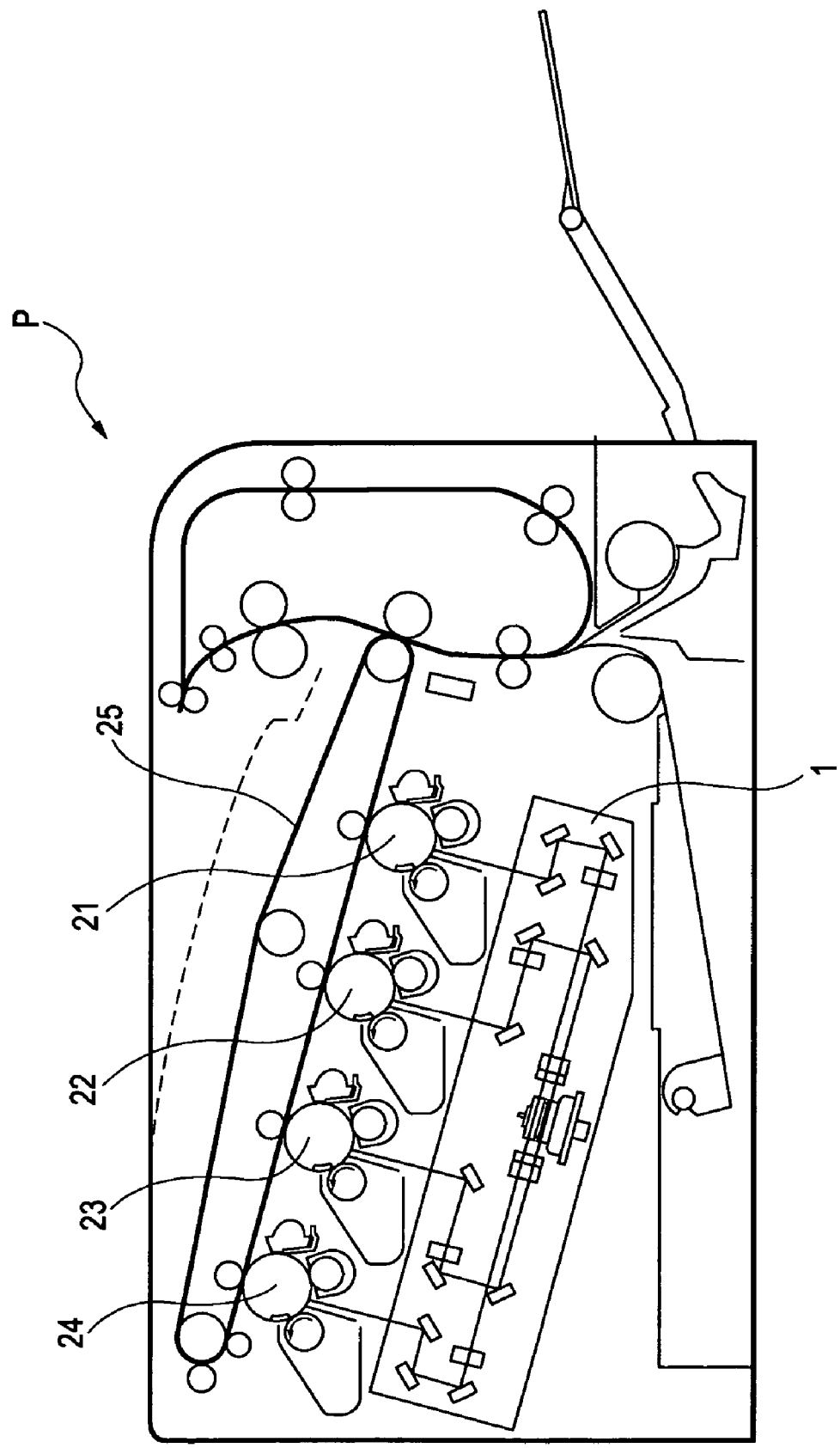
FIG. 15 is a sectional view of an image forming apparatus to which the scanning optical unit according to at least one exemplary embodiment can be applied.
Figure 16:
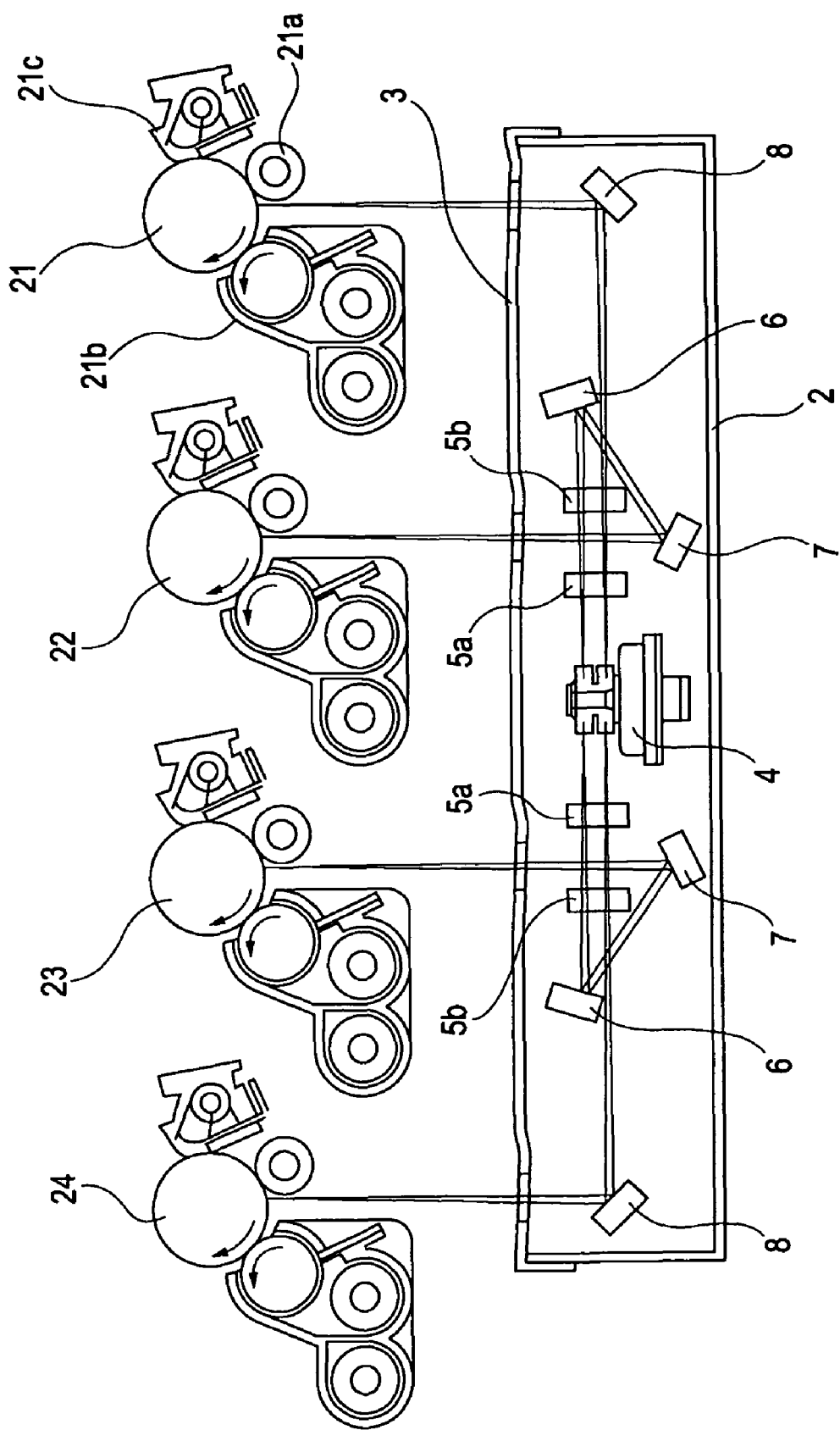
FIG. 16 is a partial sectional view showing the scanning optical unit and thereabout in the image forming apparatus of FIG. 15.

First, a description is made of one example of an image forming apparatus to which a scanning optical unit according to at least one exemplary embodiment can be applied. FIG. 15 is a sectional view of the image forming apparatus to which the scanning optical unit according to at least one exemplary embodiment can be applied. FIG. 16 is a partial sectional view showing the scanning optical unit and thereabout in the image forming apparatus of FIG. 15.

A color printer (hereinafter referred to as a "printer") P, i.e., one example of the image forming apparatus, includes a scanning optical unit 1 for scanning a photoconductive drum by a light beam (e.g., laser beam), and a plurality of photoconductive drums 21-24 which are image carriers corresponding to respective colors of Bk (black), C (cyan), M (magenta) and Y (yellow). Around the photoconductive drum 21, there are disposed a charger 21a for electrically charging the photoconductive drum 21, a developer 21b for developing a latent image, which is formed upon exposure of a charged surface, by using toner, and a cleaner 21c for cleaning the toner remaining on the photoconductive drum after transfer of the latent image. The basic construction of each of the other photoconductive drums 22, 23 and 24 is related to the above-described one, and a description thereof is omitted here.

The images developed on the four photoconductive drums 21-24 are successively transferred onto an intermediate transfer belt 25 in superimposed relation, whereby a full-color toner image is formed. Thereafter, the full-color toner image is transferred again onto a sheet of paper, i.e., a recording medium.

A deflecting unit 4 is disposed in the scanning optical unit 1 at the center thereof, and deflects the light beams emitted from four light sources (not shown) toward fθ lenses 5a, 5b to perform scanning. The scanning light beams deflected by the deflecting unit 4 are condensed by the fθ lenses 5a, 5b and are introduced to the four photoconductive drums 21, 22, 23 and 24 through folding mirrors 6, 7 and 8, thereby forming the latent images on the respective drum surfaces.

First Exemplary Embodiment (Scanning Optical Unit)

Figure 2:
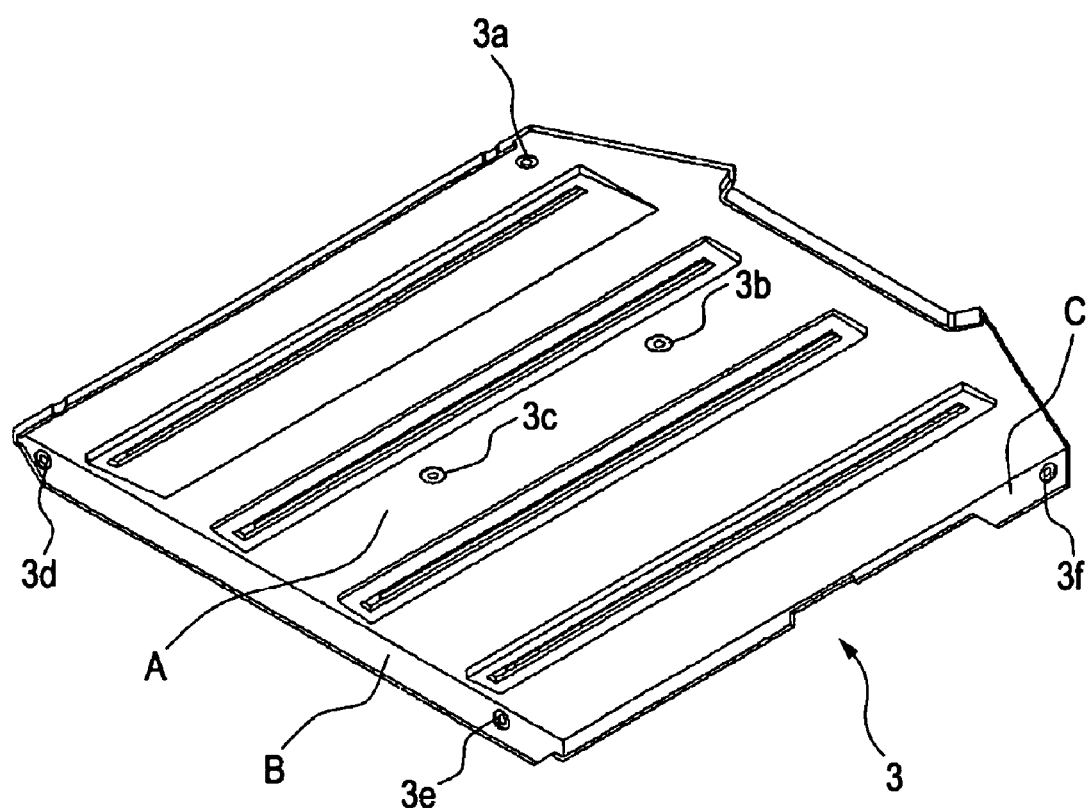
FIG. 2 is a perspective view of a cover according to the first exemplary embodiment.
Figure 3:
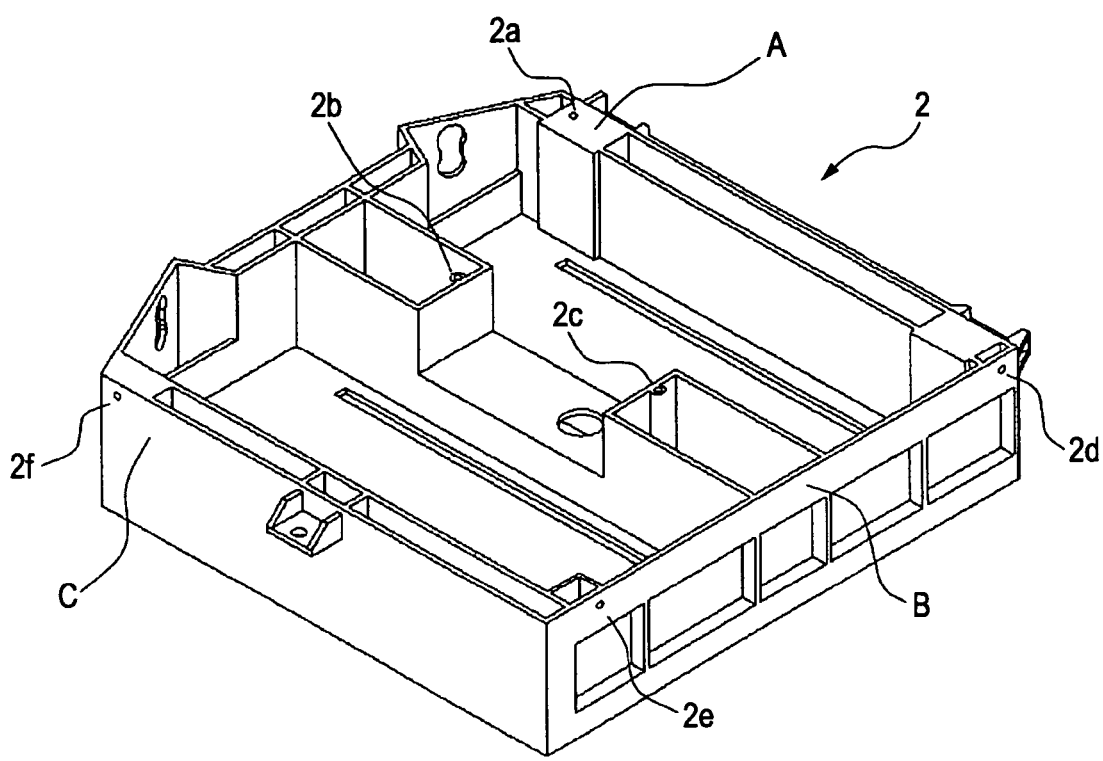
FIG. 3 is a perspective view of an optical box according to the first exemplary embodiment.

A first exemplary embodiment of the present invention will be described below with reference to the drawings. FIG. 1 is a perspective view of the scanning optical unit 1 according to the first exemplary embodiment. FIG. 2 is a perspective view of a cover according to the first exemplary embodiment. FIG. 3 is a perspective view of an optical box according to the first exemplary embodiment.

In FIG. 1, the scanning optical unit 1 is an optical unit detachably mounted to the image forming apparatus. The scanning optical unit 1 includes, as illustrated in FIGS. 2 and 3, an optical box 2 in the base body and a cover 3 covering an opening portion of the optical box 2. In this exemplary embodiment, the optical box 2 is a frame having an opening. The optical box 2 and the cover 3 are fastened together (e.g., in this non-limiting example at six fixed positions, i.e., fastened points A-1, A-2, A-3, B-1, B-2 and C-1), by using fixing members, (e.g., screws or other fasteners as known by one of ordinary skill in the relevant arts). To suppress a deviation of the scanning line caused by a deformation in the scanning optical unit 1, the optical box 2 and the cover 3 can be made of materials having high rigidity and respective linear expansion coefficients that are substantially equal to each other. In practice, the material can be a resin material including a reinforcing filler. In this first exemplary embodiment, the frame and the cover can each be a member integrally molded (e.g., in this non-limiting example using a resin material). The resin material used in this non-limiting example of the first exemplary embodiment can be a composite material (e.g., having the Young's modulus of 8240 MPa, the shear modulus of 3169.23 MPa, and the Poisson ratio of 0.3) obtained by filling 35% of glass fibers, as a reinforcing filler, in a resin of PC+ABS (copolymer of Acrylonitrile Butadiene Styrene). If the amount of the glass fibers added as the reinforcing filler is increased, the material strength is increased. That type of resin material has the linear expansion coefficient of about $2 \times 10^{-5}$ to $3 \times 10^{-5}$ (/° C.) Also, the expression "linear expansion coefficients are substantially equal to each other" means that the difference between the linear expansion coefficients is in the range of ±10% and in at least one exemplary embodiment, in the range of ±5%. Obviously exemplary embodiments are not limited to any particular resin discussed herein or even the use of resin, other materials as known by one of ordinary skill in the relevant arts and equivalents can be used.

Figure 7:
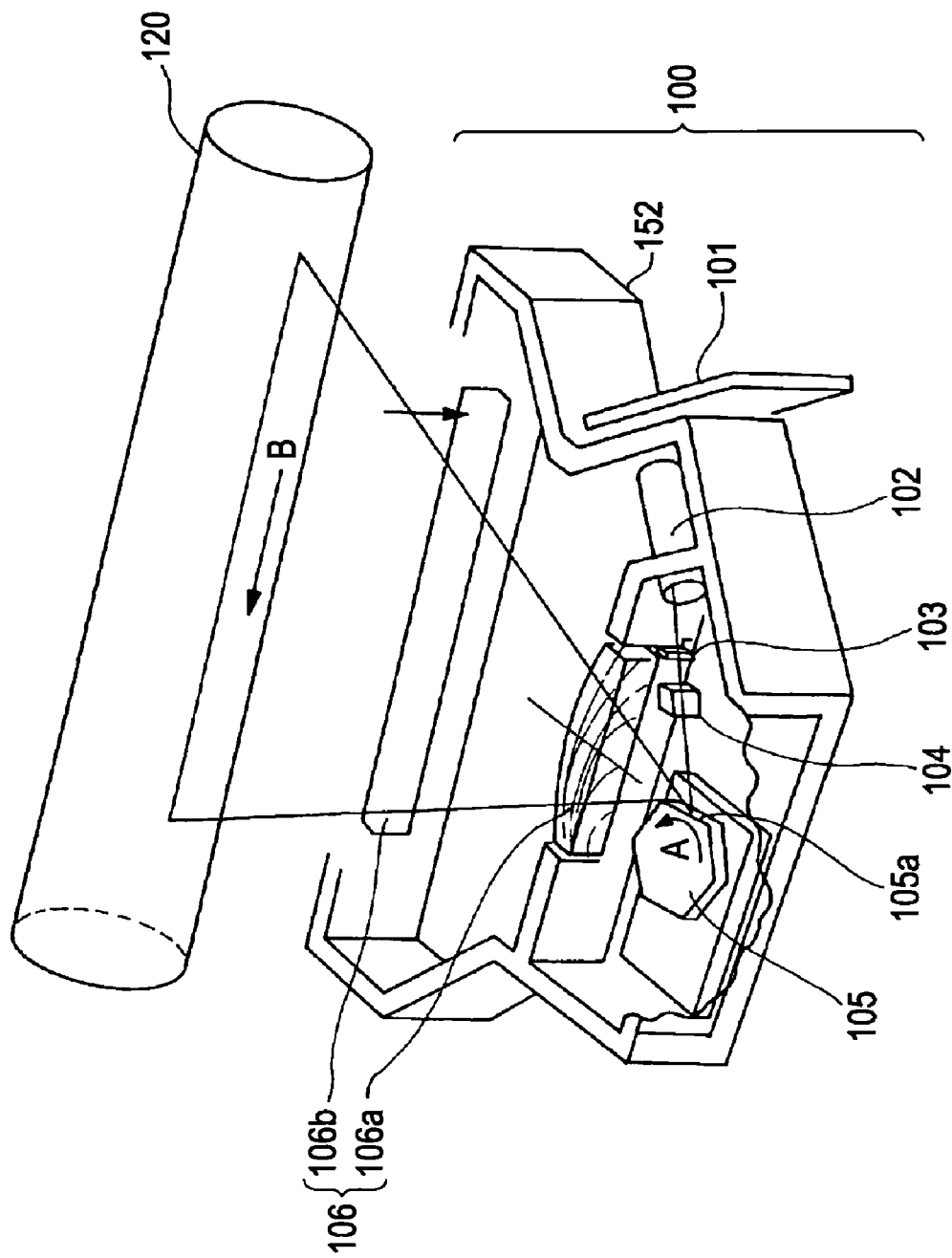
FIG. 7 is a perspective view, partly broken, of a known scanning optical unit.
Figure 8A:
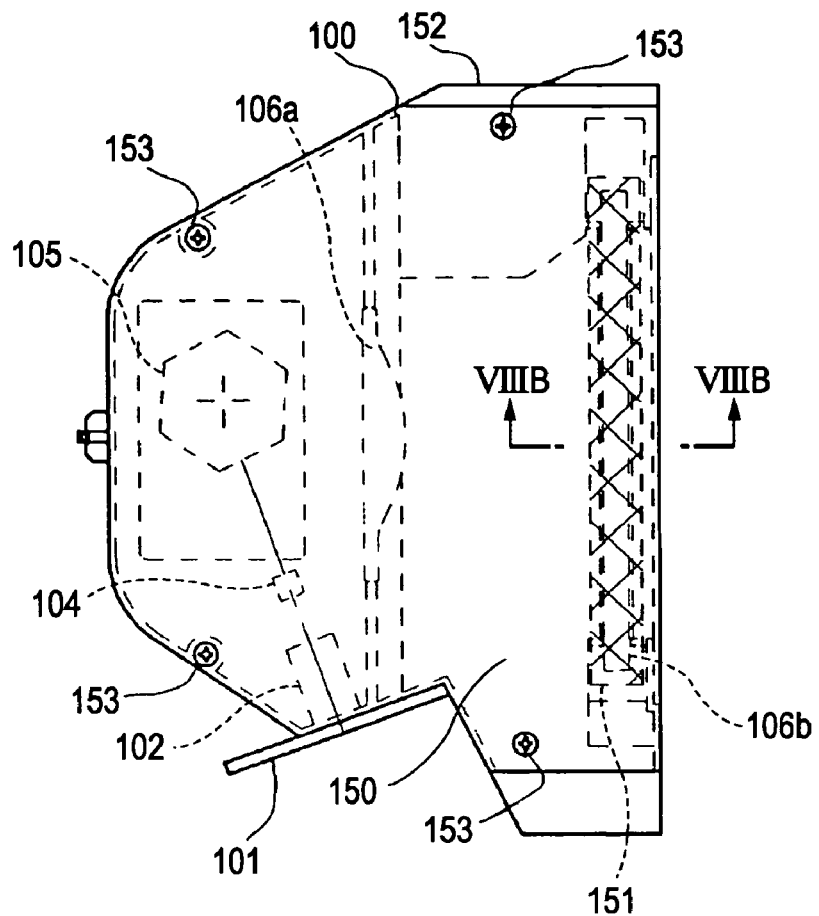
FIG. 8A is a plan view of the known scanning optical unit.
Figure 8B:
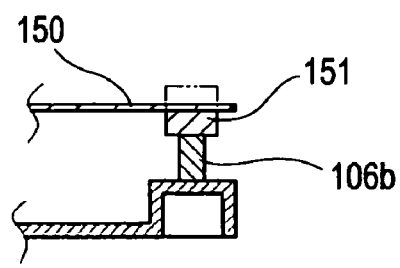
FIG. 8B is a partial sectional view taken along the line VIIIB-VIIIB in FIG. 8A.
Figure 10A:
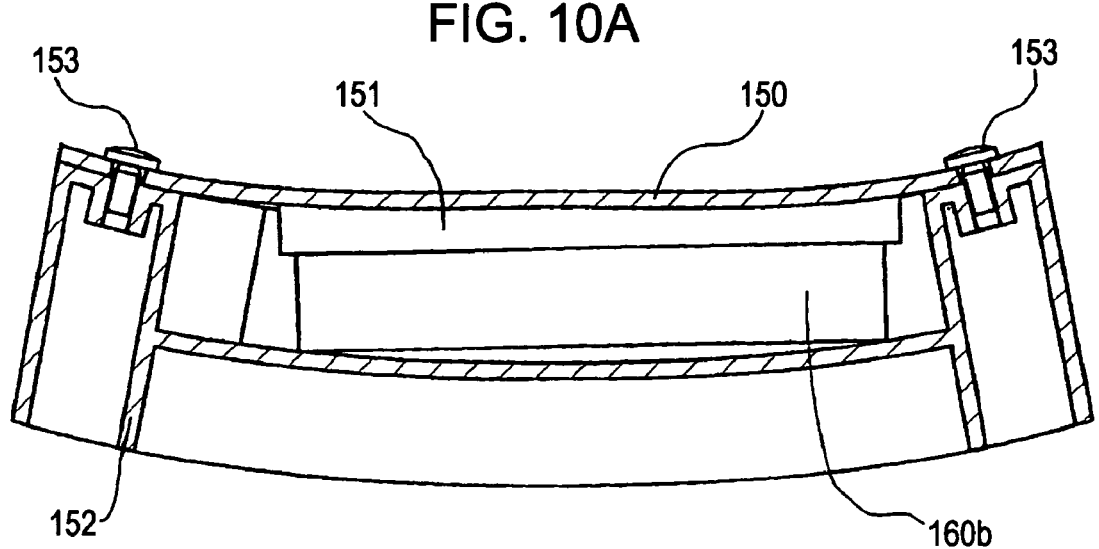
FIGS. 10A and 10B schematically show deformations due to heat when two members having different linear expansion coefficients are fixed to each other.
Figure 10B:
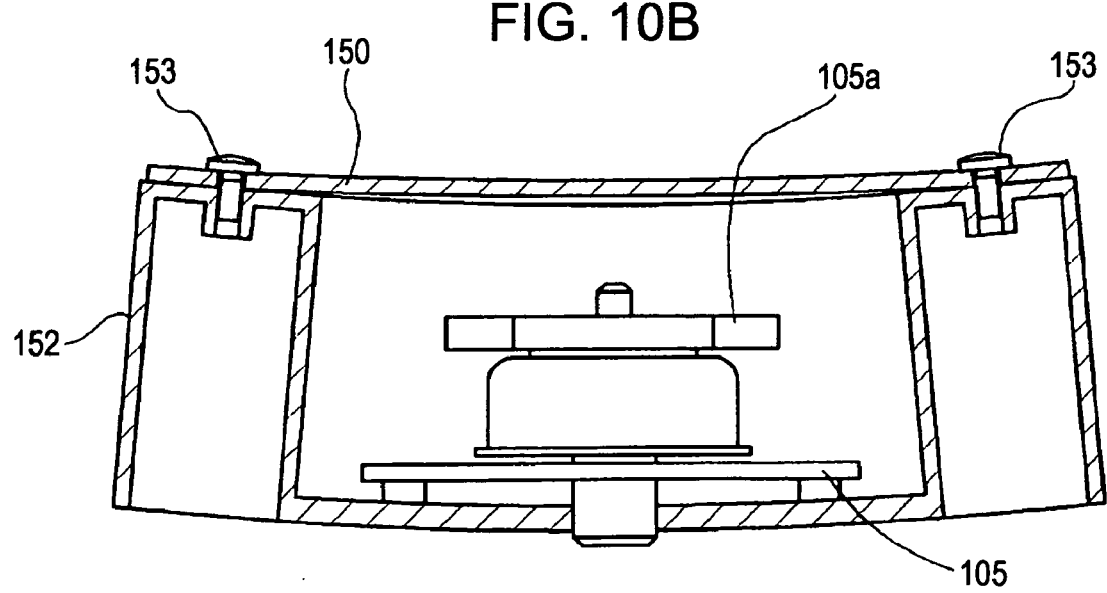
Figure 11:
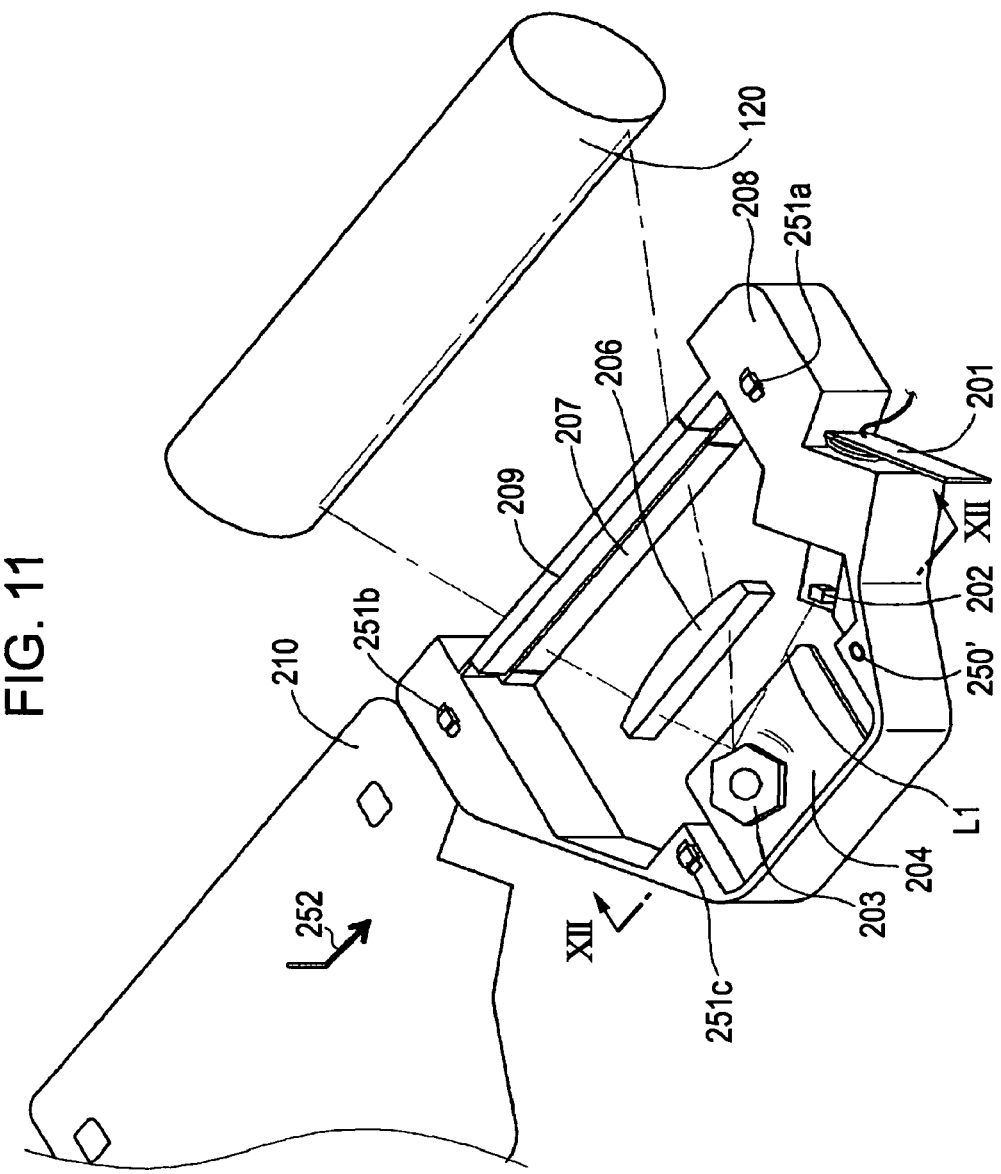
FIG. 11 is a perspective view of another known scanning optical unit.
Figure 12:
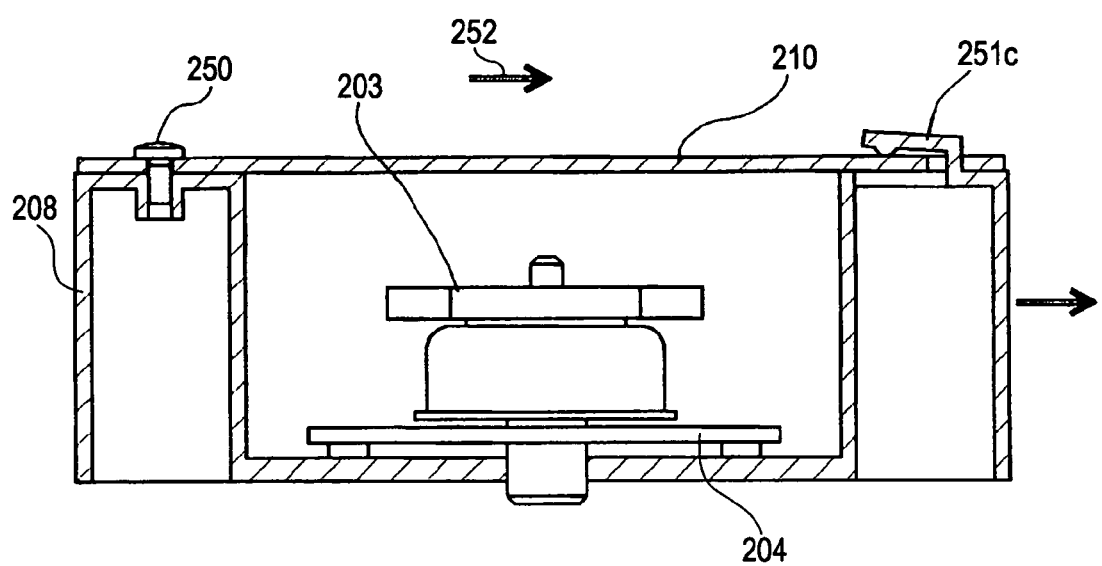
FIG. 12 is a sectional view, taken along the line XII-XII in FIG. 11, for explaining countermeasures to accommodate linear expansion due to heat in the other known scanning optical unit.
Figure 13A:
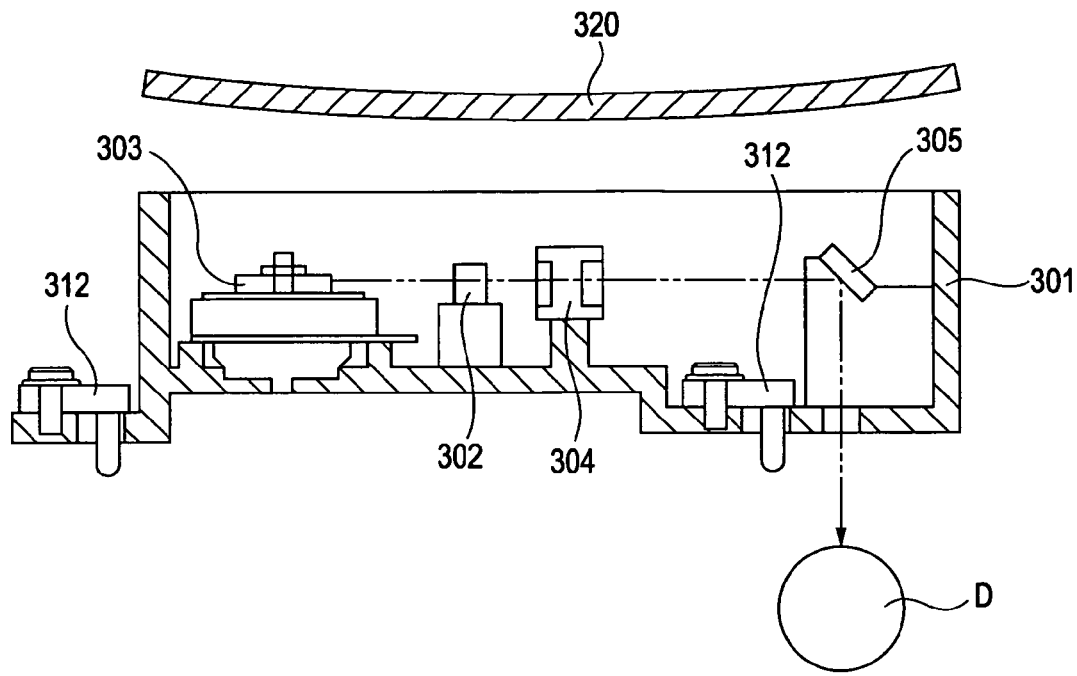
FIGS. 13A and 13B are sectional views schematically showing another deformation in the other scanning optical unit.
Figure 13B:
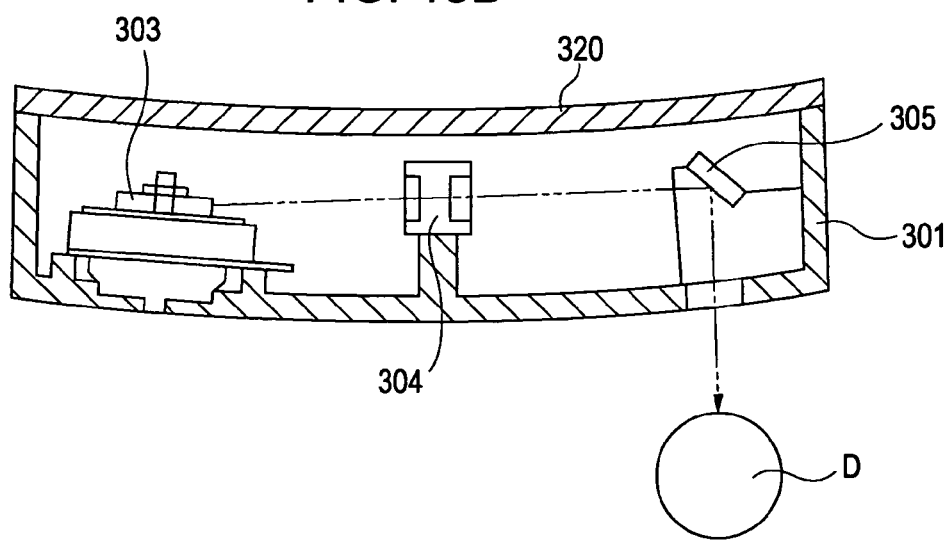
Figure 14:
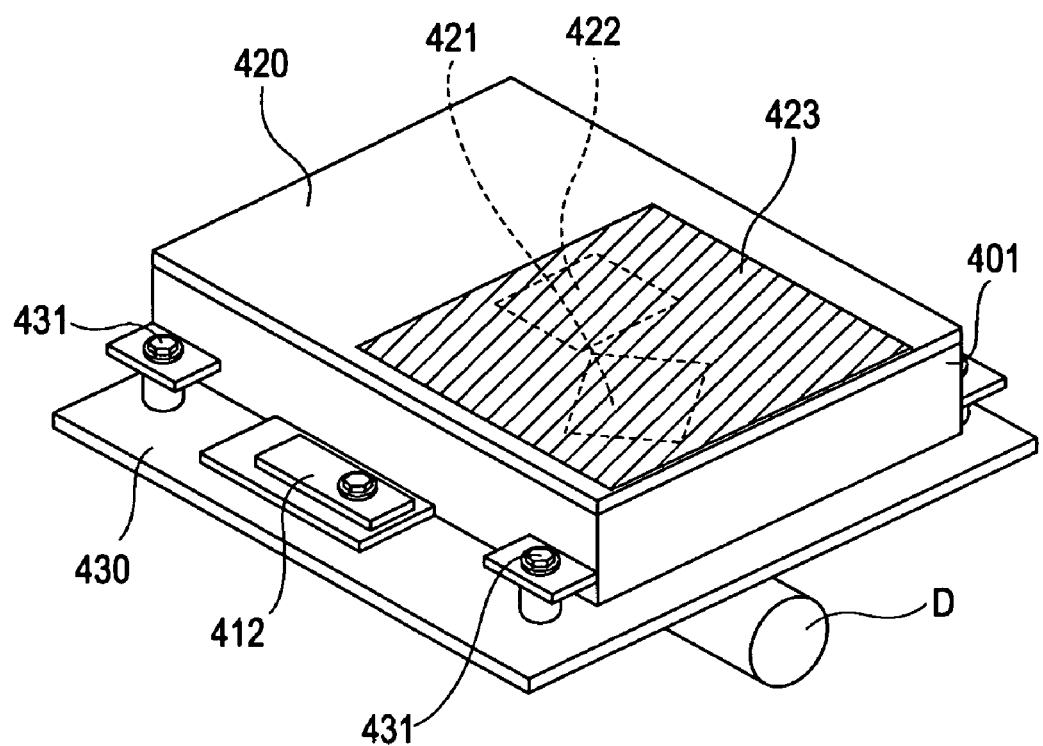
FIG. 14 is a perspective view of still another known scanning optical unit.

A deflection scan plane in which the light beams are deflected to perform scanning by a polygon mirror (see 105 in FIG. 7), i.e., a deflection scanning unit, is substantially parallel to a plane including the opening of the optical box. Among the six fastened points, the three fastened points A-1, A-2 and A-3 can be arranged on a first plane A that is substantially parallel to the deflection scan plane in which the light beams are deflected to perform scanning by the deflecting unit 4. The two fastened points B-1 and B-2 can be arranged on a second plane B that is adjacent to the first plane A and is substantially perpendicular to the first plane A. The fastened point C-1 is arranged on a third plane C that is adjacent to both the first and second planes A, B and is substantially perpendicular to both the first and second planes A, B.

The above-described arrangement is based on the fact that, from the viewpoint of geometry, the first plane A can be defined by three points, the second plane B substantially perpendicular to the first plane A can be defined by two points, and the third plane C substantially perpendicular to both the first and second planes A, B can be defined by one point. In other words, assuming the direction of the first plane A to be a Z-axis direction, the direction of the second plane B to be an X-axis direction, and the direction of the third plane C to be a Y-axis direction, a position in each of the X-, Y- and Z-axis directions can be defined.

While the second plane B is fixed at two points in this exemplary embodiment, it can be fixed at one point if the position of the cover relative to the optical box can be decided in the second plane B. This is represented, for example, by the case where the cover includes a positioning member for positioning the cover in the second plane B.

The optical box 2 has three mounted portions H-1, H-2 and H-3 where the optical box 2 is mounted to a body of the printer P, and six fastened portions 2a-2f where the cover 3 is fastened to the optical box 2. Among the six fastened portions, the fastened portions 2a, 2b and 2c correspond to the above-mentioned fastened points A-1, A-2 and A-3, the fastened portions 2d and 2e correspond to the above-mentioned fastened points B-1 and B-2, and the fastened portion 2f corresponds to the above-mentioned fastened point C-1, respectively. In this first exemplary embodiment, when the optical box 2 is mounted to the body of the image forming apparatus, flatness of a mounting plane can be maintained at a satisfactory level by fixing the optical box to the apparatus body at three points.

The cover 3 has four slits 3p through which the scanning light beams are facilitated to exit toward the photoconductive drums 21-24, four reinforcing ribs 3r provided near the slits 3p for reinforcement, and six fastened portions 3a-3f provided respectively corresponding to the six fastened portions 2a-2f of the optical box 2. In the six fastened portions 3a-3f, holes are formed through which the fixing members, e.g., screws, are inserted.

Because the cover 3 is properly positioned relative to the optical box 2 by the three planes A, B and C, the holes through which the screws or other fastening apparatus and/or methods as known by one of ordinary skill in the relevant arts are inserted are each formed as a circular hole or an elongate hole having larger a diameter (size) than the thread diameter of the screw used, to thereby avoid the cover 3 from being fixedly positioned by the screws. The diameter (size) and shape of each hole can be decided in consideration of an amount by which the hole position is changed due to a warp of the cover 3.

By arranging the six fastened portions A-1, A-2, A-3, B-1, B-2 and C-1 as described above, the cover can be fixed to the optical box without not only causing gaps at the respective fastened points, i.e., between the paired fastened portions 2a and 3a, 2b and 3b, 2c and 3c, 2d and 3d, 2e and 3e, and 2f and 3f of the optical box 2 and the cover 3, but also causing a deformation, e.g., a torsion, of the optical box 2.

Similarly, even when the cover 3 has a deformation, e.g., a warp, the fastened portions 3a-3f of the cover 3 can be aligned respectively with the fastened portions 2a-2f of the optical box 2 without causing gaps. Therefore, the optical box 2 can be kept from deforming with the fastening of the cover 3 to the optical box.

Stated another way, in the scanning optical unit 1 including the optical box 2 in which the deflecting unit 4 for deflecting the laser beam to perform scanning is disposed, and the cover 3 for covering (sealing) the opening of the optical box 2, the cover 3 has at least three surfaces fastened to the optical box 2, and the three surfaces are given by the first plane A substantially parallel to the laser beam deflected to perform scanning by the deflecting unit 4, the second plane B substantially perpendicular to the first plane A, and the third plane C substantially perpendicular to the first plane A and the second plane B. The relative positional relationship between the optical box and the cover is held substantially identical between before and after the optical box and the cover are fastened together in a state contacting with each other along those three planes. Thus, the scanning optical unit can be provided which has high rigidity and can suppress a deformation caused by fastening the cover to the optical box.

The optical unit is not always required to contain a substantial portion of the above-mentioned optical parts, such as the deflection scanning unit, the folding mirrors, and the lenses, as in this exemplary embodiment. Even when the optical unit contains some of those optical parts, e.g., the deflection scanning unit and the lenses, similar features can also be of course obtained.

Further, since in the non-limiting example the plane A has a substantially rectangular shape, the plane B is adjacent to the plane A, and the plane C is adjacent to both the planes A and B. As another example, when the plane A has a substantially pentagonal shape, the plane B is adjacent to the plane A, but the plane C is not necessarily adjacent to the plane B and it can be a plane that is not parallel to the plane B and is adjacent to the plane A.

The following description is made of an elastic deformation (vibration) caused by vibration received from the body of the image forming apparatus.

Figure 17:
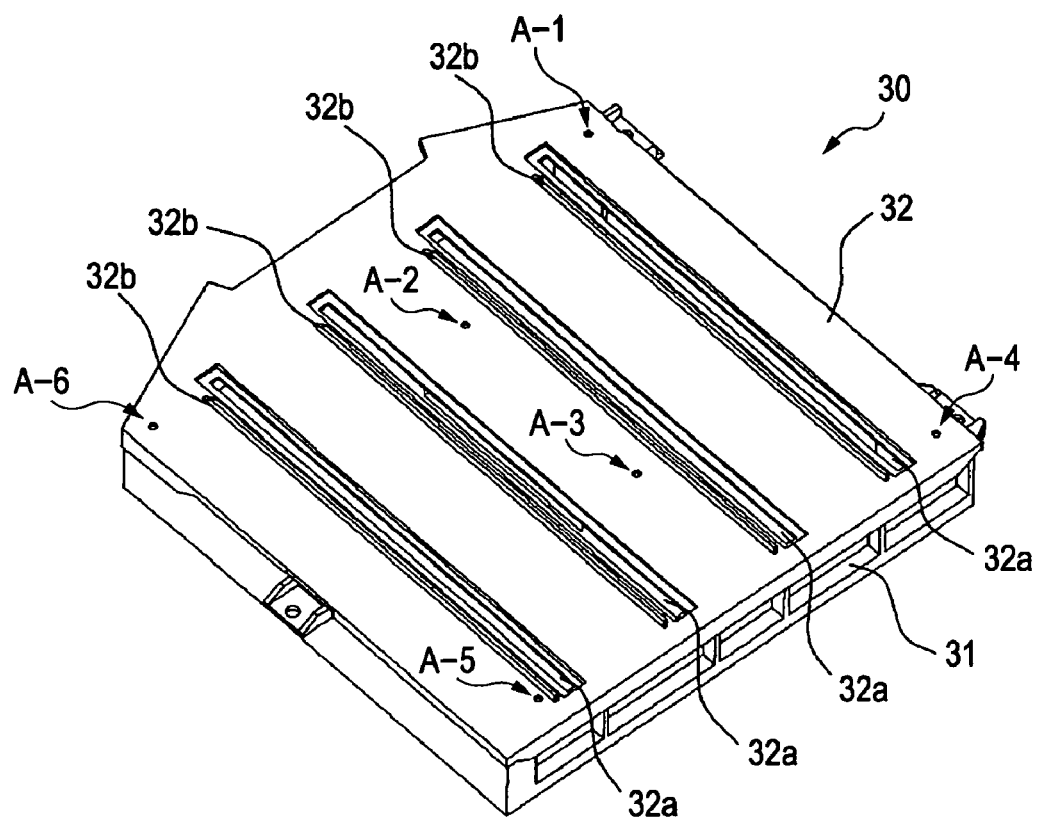
FIG. 17 is a perspective view for explaining fastened points in still another known scanning optical unit.
Figure 18:
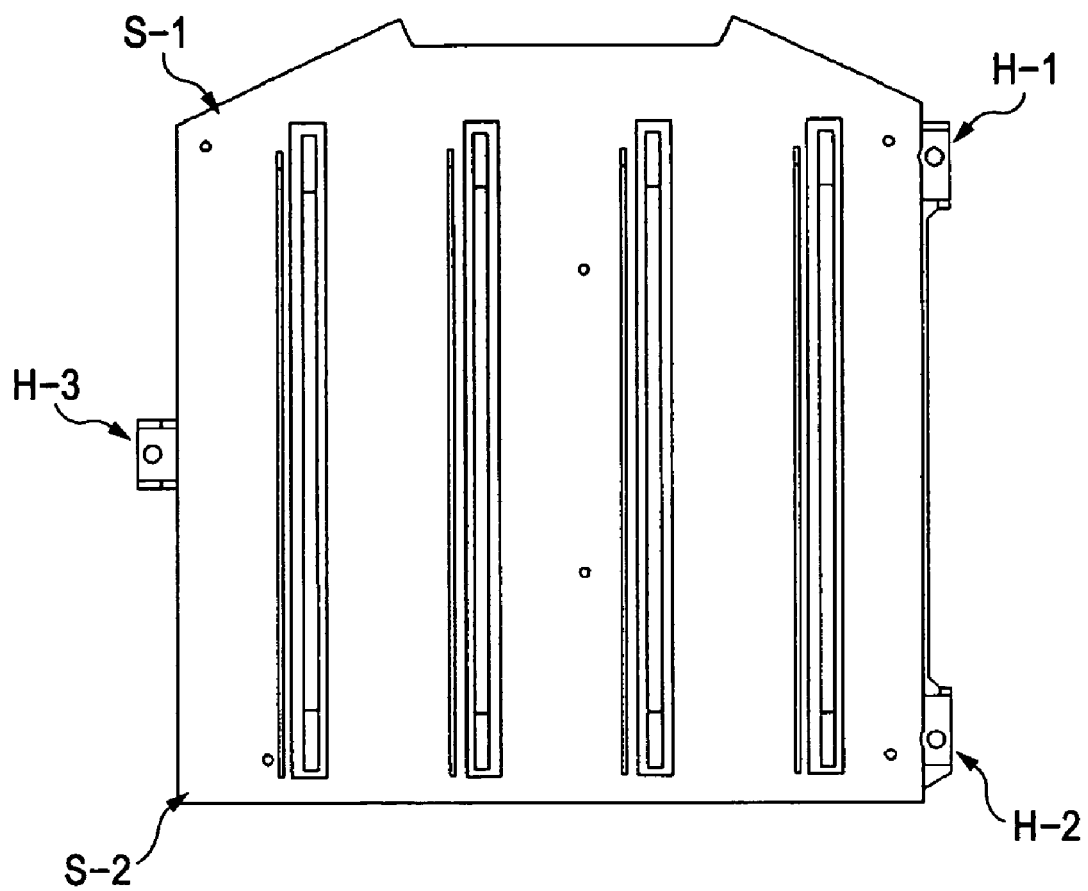
FIG. 18 is a plan view for explaining mounted portions of the known scanning optical unit, shown in FIG. 17, to the image forming apparatus.

When the scanning optical unit is mounted to the image forming apparatus, the former can be fixed to the latter at three points such that the scanning optical unit will not distort in itself with the mounting. In the typical known scanning optical unit 30, as illustrated in FIG. 17, corner portions S-1 and S-2 (FIG. 18) positioned outermost in regions externally of a triangle interconnecting the mounted portions H-1, H-2 and H-3, in which the scanning optical unit is mounted to the body of the image forming apparatus, can be particularly susceptible to the elastic deformation (vibration). Taking into account that point, in the scanning optical unit 1 of this first exemplary embodiment, the fastened portion C-1 (corresponding to A-6 in FIG. 17) is arranged near the corner portion S-1 and the fastened portion B-2 (corresponding to A-5 in FIG. 17) is arranged near the corner portion S-2, as illustrated in FIG. 1.

Figure 19:
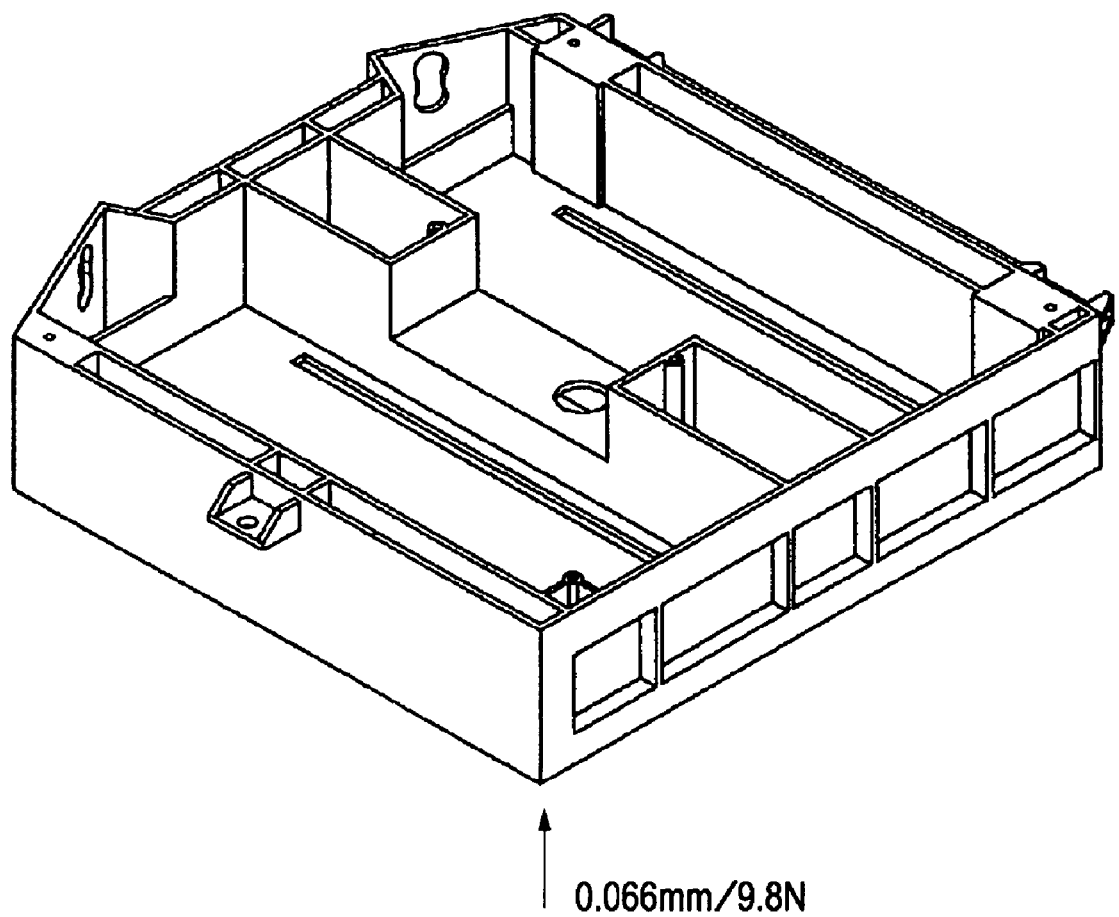
FIG. 19 is a schematic view for explaining a deformation of the optical box shown in FIG. 17.
Figure 20:
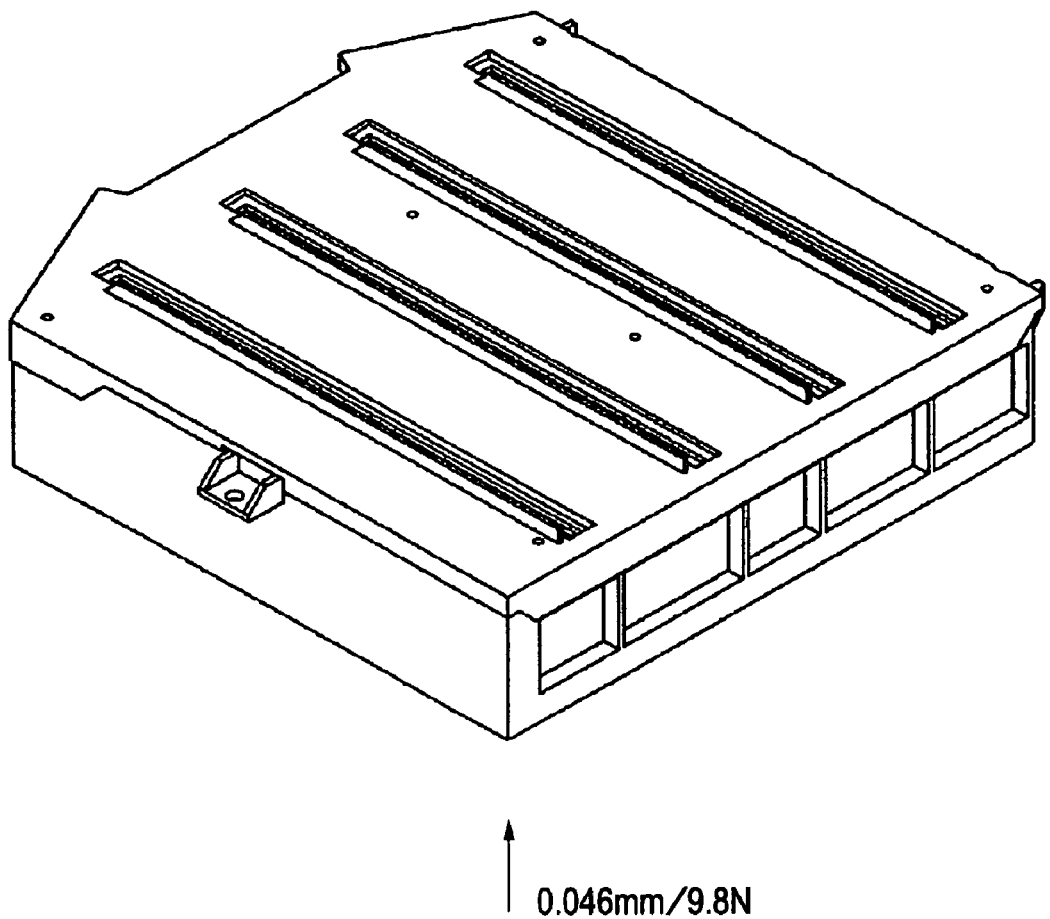
FIG. 20 is a schematic view for explaining a deformation of the scanning optical unit shown in FIG. 17.

FIGS. 19 and 20 are each a schematic view for explaining the deformation of the scanning optical unit shown in FIG. 17. For example, FIGS. 19 and 20 show the results of analyzing the deformation of the optical box alone and the scanning optical unit in which the cover 32 is fastened to the optical box 31 at the six fastened points A-1 to A-6 by screws (not shown) in the same direction, i.e., in one plane, when a load of 9.8 N is applied the corner portion S-2. In this analysis, the optical box and the cover are each made of the resin material (having the Young's modulus of 8240 MPa, the shear modulus of 3169.23 MPa, and the Poisson ratio of 0.3) obtained by filling 35% of glass fibers in a resin of PC+ABS.

As illustrated in FIG. 19, the deformation of the optical box 31 alone is 0.066 mm. On the other hand, as illustrated in FIG. 20, the deformation of the scanning optical unit 30 completed by fastening the cover 32 to the optical box 31 at the six points in the same one plane is 0.046 mm. It is hence apparent that the corner portion S-2 is less susceptible to the elastic deformation (vibration) in the latter case.

Thus, in order to increase the rigidity (strength) of the entire scanning optical unit by fixing the cover to the optical box, the number of fastened points between the cover and the optical box can be increased. However, when the cover is fixed at four or more points in one plane, flatness cannot be facilitated and a possibility of deformation of the optical box is increased.

Figure 4:
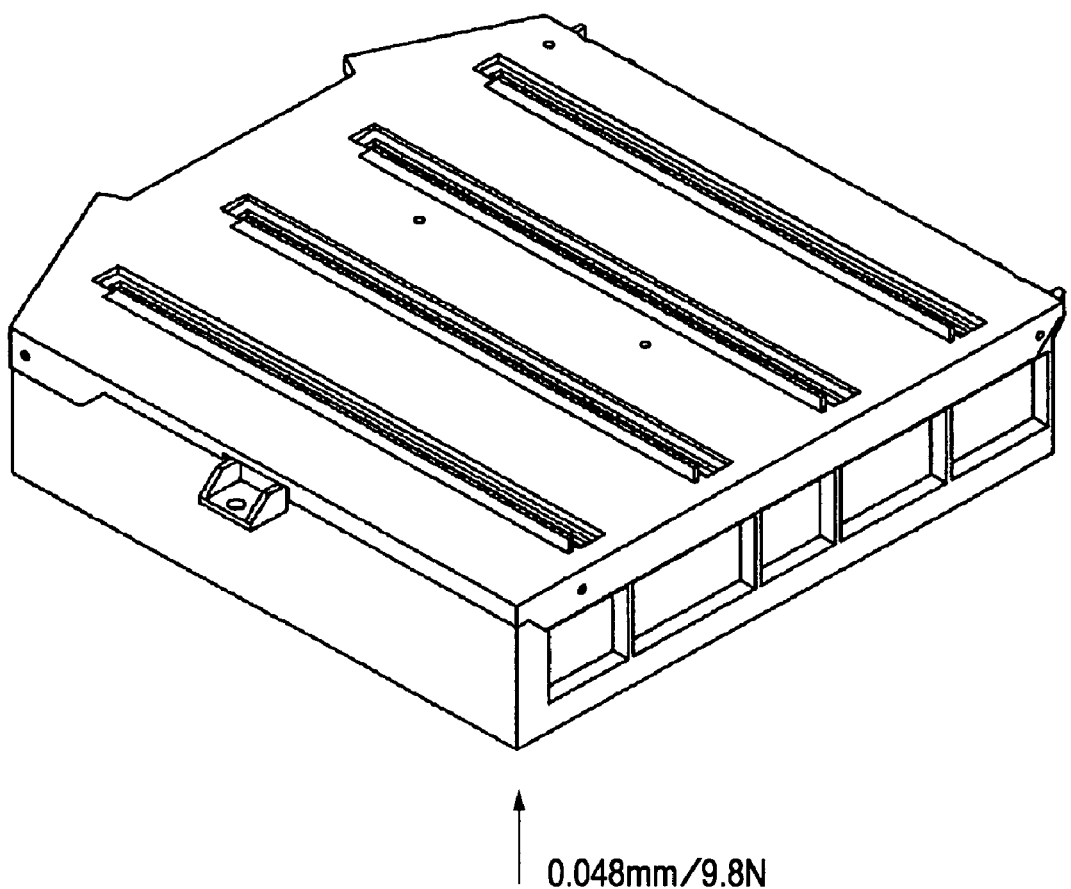
FIG. 4 is a schematic view for explaining a deformation of the optical box according to the first exemplary embodiment.

In contrast, in the scanning optical unit 1 shown in FIG. 1 wherein the cover is fastened to the optical box at the six points in total, i.e., the three fastened points A-1, A-2 and A-3 in the first plane A, the two fastened points B-1 and B-2 in the second plane B substantially perpendicular to the first plane A, and the one fastened point C-1 in the third plane C substantially perpendicular to the first plane A and the second plane B, the deformation of the scanning optical unit 1 resulted from applying a load of 9.8 N to the corner portion S-2 is 0.048 mm as illustrated in FIG. 4. This result is equivalent to that in the case of the scanning optical unit 30 shown in FIG. 17.

According to the scanning optical unit of this first exemplary embodiment, as described above, since the cover 3 covers the largest opening of the optical box 2 and its surface defined by the first plane A substantially parallel to the light beams deflected to perform scanning by the deflecting unit is fastened to the optical box 2 at three points, satisfactory flatness of the cover can be facilitated. Also, the cover is further fastened to the optical box in the second plane B and the third plane C, the fastening of the cover contributes to suppressing a deformation of the optical box and increasing the rigidity of the scanning optical unit in its entirety. Thus, by using the scanning optical unit of this first exemplary embodiment, it is possible to provide an image forming apparatus which is less susceptible to a deviation of the scanning line and ensures a high-quality image.

Second Exemplary Embodiment

Figure 5:
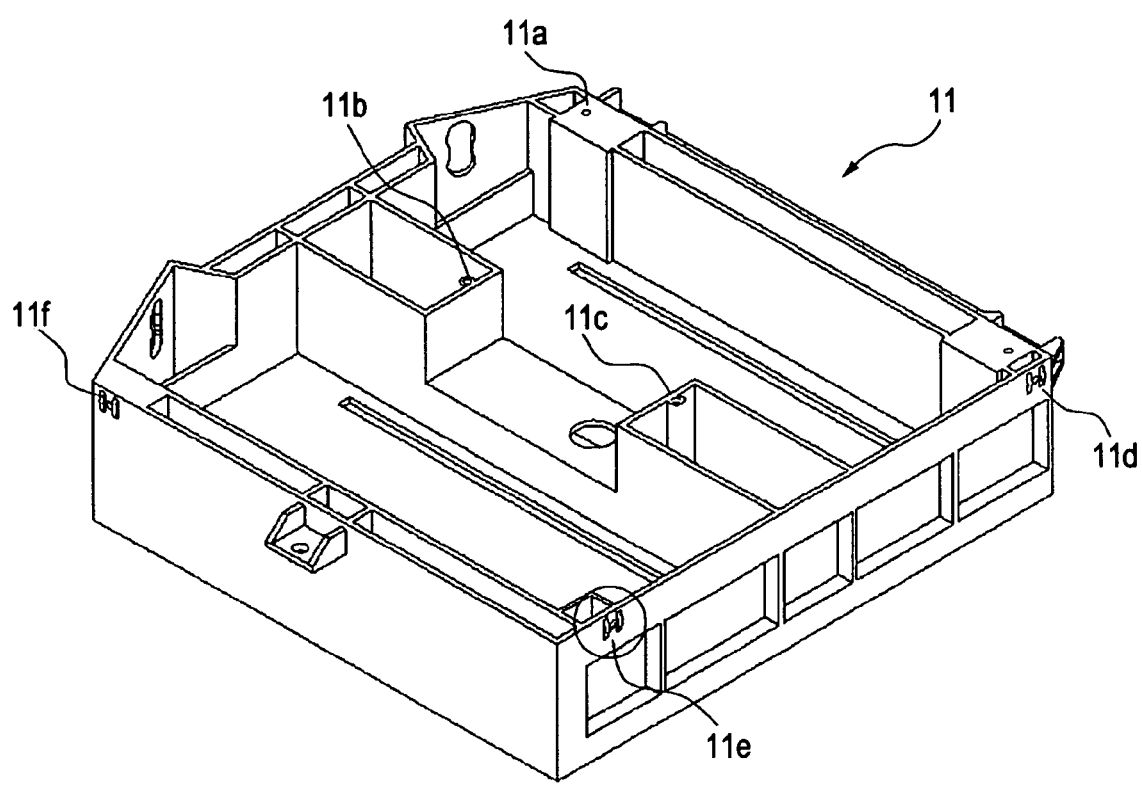
FIG. 5 is a perspective view for explaining fastened portions of an optical box in a scanning optical unit according to a second exemplary embodiment of the present invention.
Figure 6A:
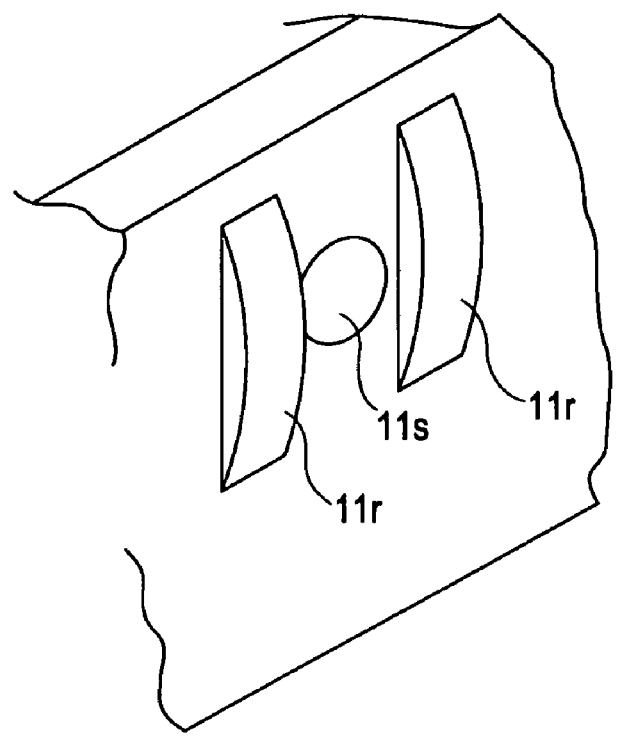
FIGS. 6A and 6B are each an enlarged view of the fastened portion in FIG. 5.
Figure 6B:
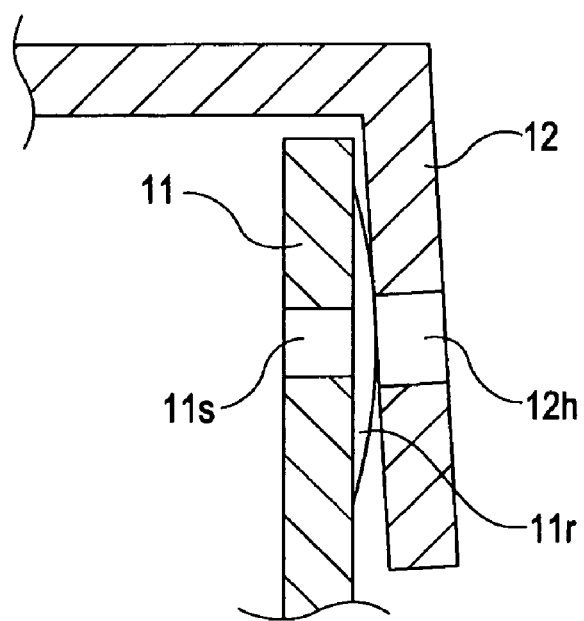

FIG. 5 is a perspective view for explaining fastened portions of an optical box in a scanning optical unit according to a second exemplary embodiment of the present invention. FIGS. 6A and 6B are each an enlarged view of the fastened portion in FIG. 5.

An optical box 11 in this second exemplary embodiment differs from the optical box 2 in the above-described first exemplary embodiment in shape of the fastened portions in the second plane B and the third plane C.

Fastened portions 11d, 11e and 11f are provided in the optical box 11. In each of those fastened portions, as illustrated in FIG. 6A, two partial cylindrical surfaces 11r are formed on both sides of a threaded hole 11s in which a fixing member, e.g., a screw, is engaged. Each of the partial cylindrical surfaces 11r has a center axis parallel to the first plane A and the second plane B or a center axis parallel to the first plane A and the third plane C. The fastened portions can be provided in the cover 12, or in both of the optical box 11 and the cover 12.

With such an arrangement, as illustrated in FIG. 6B, even if an angle of the fastened portion in the second plane B or the third plane C differs between the optical box 11 and the cover 12, a gap is prevented and/or reduced from being caused in the fastened portion. The reference 12h denotes a hole used for fixing the cover 12 to the optical box 11 by using a screw as one example a fixing member. The screw is inserted through the hole 12h and is fastened into the screwed hole 11s which is formed in the optical box 11.

While the above exemplary embodiments have been described as using a screw as the fixing member, the fixing member is not limited to the screw and any other suitable members than the screw can also be used so long as they are able to fix the cover and the optical box (frame) to each other. When the cover is fixed at plural points in one plane, the type of the fixing member can differ depending on the fixed point.

According to at least one exemplary embodiment, the rigidity of the optical unit can be increased without causing a torsion in the plane including an opening when a cover is attached to the opening.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-175116 filed Jun. 15, 2005, which is hereby incorporated by reference herein in its entirety.

What is claimed is:

1. An optical unit adapted to perform exposure, the optical unit comprising:
    a base body having optical parts and having an opening; and
    a cover adapted to cover the opening portion of the base body, the cover being fixed to the base body at three points in a first plane, the cover being further fixed to the base body at a second plane positioned on the base body and being adjacent to the first plane and at a third plane positioned on the base body and being not parallel to the second plane,
    wherein the cover is fixed to the base body at two points in the second plane and at one point in the third plane, and
    wherein the cover is fixed via fasteners through fastener holes, wherein at least one of the fastener holes has two partial cylindrical surfaces formed on both sides of the at least one fastener hole, and wherein each of the partial cylindrical surfaces has a center axis parallel to the first plane and the second plane.

2. The optical unit according to claim 1, further comprising a deflection scanning device adapted to deflect a laser beam to perform scanning, wherein a plane in which the laser beam is deflected to perform scanning by the deflection scanning device is substantially parallel to the first plane.

3. The optical unit according to claim 1, wherein the frame and the cover are made of the same material or materials having linear expansion coefficients substantially equal to each other.

4. The optical unit according to claim 1, wherein the base body and the cover are made of a resin material containing a reinforcing filler.

5. The optical unit according to claim 1, wherein one or more slits allowing passage of light beams are formed in at least one of the frame and the cover.

6. The optical unit according to claim 1, wherein a plurality of light beams emitted from a plurality of light sources are deflected by one deflection scanning device.

7. The optical unit according to claim 6, wherein exposure of a plurality of image carriers is performed by the plurality of light beams.

8. An image forming apparatus including an image forming device adapted to form an image on a recording material, wherein an optical unit according to claim 1 is fixed to the image forming apparatus at three points.

9. The optical unit according to claim 1, wherein the at least one fastener hole is in the cover.

10. An optical unit adapted to perform exposure, the optical unit comprising:
   a base body having optical parts and having an opening; and
   a cover adapted to cover the opening portion of the base body, the cover being fixed to the base body at three points in a first plane, the cover being further fixed to the base body at a second plane positioned on the base body and being adjacent to the first plane and at a third plane positioned on the base body and being not parallel to the second plane,
   wherein the cover is fixed to the base body at two points in the second plane and at one point in the third plane, and
   wherein the cover is fixed via fasteners through fastener holes, wherein at least one of the fastener holes has two partial cylindrical surfaces formed on both sides of the at least one fastener hole, and wherein each of the partial cylindrical surfaces has a center axis parallel to the first plane and the third plane.

11. The optical unit according to claim 10, wherein the at least one fastener hole is in the cover.

12. The optical unit according to claim 10, further comprising a deflection scanning device adapted to deflect a laser beam to perform scanning, wherein a plane in which the laser beam is deflected to perform scanning by the deflection scanning device is substantially parallel to the first plane.

13. The optical unit according to claim 10, wherein the frame and the cover are made of the same material or materials having linear expansion coefficients substantially equal to each other.

14. The optical unit according to claim 10, wherein the base body and the cover are made of a resin material containing a reinforcing filler.

15. The optical unit according to claim 10, wherein one or more slits allowing passage of light beams are formed in at least one of the frame and the cover.

16. The optical unit according to claim 10, wherein a plurality of light beams emitted from a plurality of light sources are deflected by one deflection scanning device.

17. The optical unit according to claim 16, wherein exposure of a plurality of image carriers is performed by the plurality of light beams.

18. An image forming apparatus including an image forming device adapted to form an image on a recording material, wherein an optical unit according to claim 10 is fixed to the image forming apparatus at three points.

* * * * *